United States Patent
Wei et al.

(10) Patent No.: US 10,114,457 B2
(45) Date of Patent: Oct. 30, 2018

(54) INTERACTION METHOD BETWEEN PIECES OF EQUIPMENT AND NEAR-TO-EYE EQUIPMENT

(71) Applicant: Beijing Zhigu Rui Tuo Tech Co., Ltd, Beijing (CN)

(72) Inventors: Na Wei, Beijing (CN); Lin Du, Beijing (CN)

(73) Assignee: BEIJING ZHIGU RUI TUO TECH CO., LTD, Beijing (CN)

( * ) Notice: Subject to any disclaimer, the term of this patent is extended or adjusted under 35 U.S.C. 154(b) by 0 days.

(21) Appl. No.: 15/184,995

(22) Filed: Jun. 16, 2016

(65) Prior Publication Data
US 2016/0370857 A1     Dec. 22, 2016

(30) Foreign Application Priority Data

Jun. 17, 2015 (CN) .......................... 2015 1 0337539

(51) Int. Cl.
*G06F 3/01* (2006.01)
*G06K 9/00* (2006.01)
*G06F 21/32* (2013.01)

(52) U.S. Cl.
CPC .............. *G06F 3/013* (2013.01); *G06F 3/012* (2013.01); *G06F 21/32* (2013.01); *G06K 9/0061* (2013.01);
(Continued)

(58) Field of Classification Search
CPC .............. G06K 9/0061; G06K 9/00604; G06K 9/00335; G06F 3/013; G06F 3/012; G06F 21/32
See application file for complete search history.

(56) References Cited

U.S. PATENT DOCUMENTS

| 8,854,433 B1 | 10/2014 | Rafii |
| 2005/0052427 A1* | 3/2005 | Wu ..................... G06F 3/04883 345/173 |

(Continued)

FOREIGN PATENT DOCUMENTS

| CN | 102265242 A | 11/2011 |
| CN | 102822771 A | 12/2012 |

(Continued)

OTHER PUBLICATIONS

Office Action dated Aug. 24, 2017 for U.S. Appl. No. 15/184,999, 21 pages.

(Continued)

*Primary Examiner* — Ariel Balaoing
(74) *Attorney, Agent, or Firm* — Amin, Turocy & Watson, LLP (57) ABSTRACT

An interaction method between pieces of equipment and near-to-eye equipment is provided. A method comprises: obtaining second motion information of user eyes by near-to-eye equipment, obtaining first motion information of user equipment; and executing an interaction operation with the user equipment in response to the first motion information matching with the second motion information. A natural, portable and safe interaction method is provided between pieces of equipment. An interaction between the near-to-eye equipment and one or more pieces of user equipment is enhanced so that the user wants to interact in a case that multiple pieces of user equipment exist in a view of the user eyes.

22 Claims, 8 Drawing Sheets

(52) U.S. Cl.
CPC ..... *G06K 9/00335* (2013.01); *G06K 9/00604* (2013.01)

(56) References Cited

U.S. PATENT DOCUMENTS

| | | | |
|---|---|---|---|
| 2009/0303204 A1 | 12/2009 | Nasiri et al. | |
| 2011/0175932 A1* | 7/2011 | Yu | G06F 3/013 345/661 |
| 2012/0257035 A1 | 10/2012 | Larsen | |
| 2013/0141325 A1 | 6/2013 | Bailey | |
| 2013/0342672 A1 | 12/2013 | Gray et al. | |
| 2014/0309867 A1* | 10/2014 | Ricci | H04W 48/04 701/36 |
| 2015/0370336 A1* | 12/2015 | Kauffmann | G06F 3/017 345/156 |

FOREIGN PATENT DOCUMENTS

| | | | |
|---|---|---|---|
| CN | 104199546 A | 12/2014 | |
| CN | 104243279 A | 12/2014 | |

OTHER PUBLICATIONS

Office Action dated Aug. 24, 2017 for U.S. Appl. No. 15/185,002, 20 pages.
Office Action dated Aug. 30, 2017 for U.S. Appl. No. 15/185,002, 13 pages.
Chinese Office Action dated Jul. 3, 2018 for Chinese Patent Application No. 201510337539.0, 12 pages (with translation).

* cited by examiner

FIG. 4

INTERACTION METHOD BETWEEN PIECES OF EQUIPMENT AND NEAR-TO-EYE EQUIPMENT

RELATED APPLICATION

The present application claims the benefit of priority to Chinese Patent Application No. 201510337539.0, filed on Jun. 17, 2015, and entitled "Interaction Method between Pieces of Equipment and Near to Eye User Equipment", which application is hereby incorporated into the present application by reference in its entirety.

TECHNICAL FIELD

The present application relates to the technical field of interaction between pieces of equipment, and, for example, to an interaction method between pieces of equipment and near-to-eye equipment.

RELATED ART

Along with continuous increase of variety of user equipment and continuous enhancing of functions, more convenience is brought in life and study of a user. On such base, the user hopes that the operation on the user equipment is simpler and more convenient, particularly, when interacting with other pieces of equipment by the user equipment, the user hopes that such interaction is automatically performed in a natural and safe manner, and the user is disturbed as little as possible.

SUMMARY

An example, non-limiting object of embodiments of the present application is to provide an interaction solution between pieces of equipment.

On a first aspect, an example embodiment of the present application provides an interaction method, comprising:

obtaining second motion information of at least one eye of a user by near-to-eye equipment;

obtaining, by the near-to-eye equipment, first motion information of user equipment; and executing, by the near-to-eye equipment, an interaction operation with the user equipment in response to the first motion information matching with the second motion information.

On a second aspect, an example embodiment of the present application provides a user equipment, comprising:

a first information obtaining module, configured for obtaining first motion information of user equipment;

a second information obtaining module, configured for obtaining second motion information of at least one eye of a user; and an executing module, configured for executing an interaction operation with the user equipment in response to the first motion information matching with the second motion information.

On a third aspect, an example embodiment of the present application provides a near-to-eye equipment, comprising:

a memory, configured for storing a command;

a processor, configured for executing the command of the memory, wherein the command enables the processor to execute following operations:

a memory, configured for storing a command;

a processor, configured for executing the command of the memory, wherein the command enables the processor to execute following operations:

obtaining second motion information of at least one eye of a user;

obtaining first motion information of user equipment; and executing an interaction operation with the user equipment in response to the first motion information matching with the second motion information.

According to at least one example embodiment of the present application, when motion information of a piece of user equipment is matched with the motion information of at least one eye of a user collected by a piece of near-to-eye equipment, an interaction operation with the user equipment is performed, and a natural, portable and safe interaction method between pieces of equipment is provided. The present application is particularly suitable for performing interaction between the near-to-eye equipment and one or more pieces of user equipment that the user wants to interact in a case that a plurality of pieces of user equipment exist in a view of the at least one eye of the user.

DETAILED DESCRIPTION

The following further describes example embodiments of the present application in detail in combined with drawings (same numbers in the plural drawings denote same elements) and embodiments. The following embodiments intend to describe the present application rather than limiting a scope of the present application.

Those skilled in the art should understand that the terms such as "first" and "second" in the present application merely intend to differentiate different steps, equipment or modules, and represent neither any specific technical meaning nor a necessary logic sequence among them.

Figure 1:
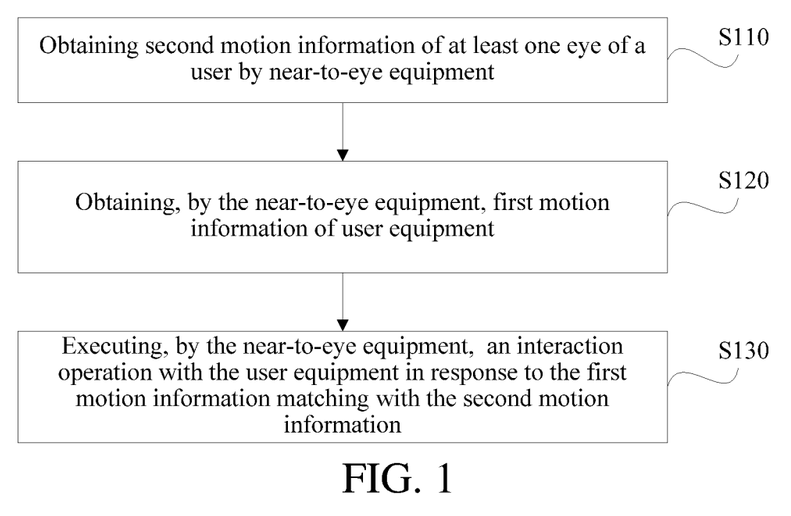
FIG. 1 is a flow chart of an interaction method between pieces of equipment according to an example embodiment of the present application.

As shown in FIG. 1, an embodiment of the present application provides an interaction method, comprising:

S110: obtaining second motion information of at least one eye of a user by near-to-eye equipment;

S120: obtaining, by the near-to-eye equipment, first motion information of user equipment; and S130: executing, by the near-to-eye equipment, an interaction operation with the user equipment in response to the first motion information matching with the second motion information.

For example, the near-to-eye equipment provided in the present application serves as an execution main body of the present embodiment to execute S110-S130. Specifically, the near-to-eye equipment can be intelligent glasses, intelligent helmet and the like collecting user eye information, wherein the intelligent glasses comprises intelligent frame glasses and intelligent contact lenses.

According to at least one example embodiment of the present application, when motion information of a piece of user equipment is matched with the motion information of at least one eye of a user collected by a piece of near-to-eye equipment, an interaction operation with the user equipment is performed, and a natural, portable and safe interaction method between pieces of equipment is provided. The present application is particularly suitable for performing interaction between the near-to-eye equipment and one or more pieces of user equipment that the user wants to interact in a case that a plurality of pieces of user equipment exist in a view of the at least one eye of the user.

Respective steps of the embodiment of the present application are further described by following implementation modes.

S110: obtaining second motion information of at least one eye of a user by near-to-eye equipment.

In an example embodiment, the second motion information can comprise: second motion feature information of at least one eye, wherein motion of the at least one eye can comprise: motion of the at least one eye in at least one eye socket or motion of the at least one eye along with a head of the user, therefore, in an example embodiment, the second motion feature information can comprise: the eye motion feature information of the at least one eye and the head motion feature information of the user.

In an example embodiment, optionally, the eye motion feature information comprises rotation information of eye balls in the eye sockets. In another example embodiment, optionally, the eye motion feature information can further comprise distance information of a gazing point of the at least one eye to the at least one eye.

The eye motion feature information for example can be obtained by an eye facing camera or an ocular electrical signal sensor facing the at least one eye on the near-to-eye equipment. The head motion feature information of the user can be obtained by an inertia sensor in a device worn by the head of the user (for example, the near-to-eye equipment, an earpiece and the like).

In another example embodiment, the second motion feature information comprises:
motion feature information of a gazing point of the at least one eye.

In an example embodiment, for example, the motion feature information of the gazing point can be obtained according to foregoing eye motion feature information and the head motion feature information.

In an example embodiment, optionally, the second motion information further comprises: second timestamp information corresponding to the second motion feature information.

Corresponding between the second timestamp information and the second motion feature information for example can be as follows:
the second timestamp information comprises timestamp information of each point or at least one feature point in the second motion feature information.

In an example embodiment, in order to enhance comparability with other pieces of equipment, and optionally, the second timestamp information is absolute timestamp information. For example, in an example embodiment, the near-to-eye equipment is synchronized with time of a time server by network, and the absolute timestamp information is the time obtained by synchronizing with the time server.

In an example embodiment, optionally, the S110 comprises collecting the second motion information by the near-to-eye equipment through a corresponding sensor.

In another example embodiment, the S110 further comprises: reading the second motion information stored in a memory from the local memory by the near-to-eye equipment.

S120: obtaining, by the near-to-eye equipment, first motion information of user equipment.

The user equipment can be convenient-to-move portable equipment or other pieces of equipment with a movable part. The user equipment comprises but is not limited to an intelligent watch, an intelligent ring, an intelligent cellphone, intelligent glasses and an intelligent helmet.

In an example embodiment, the first motion information comprises: first motion feature information of the user equipment.

In an example embodiment, the first motion feature information for example can be one or more of pieces of information directly representing motion of the user equipment, such as a motion direction, a motion speed, a motion distance, motion time and a motion acceleration.

In another example embodiment, the first motion feature information can also be one or more of pieces of information indirectly representing motion of the user equipment. For example, in an example embodiment, the first motion feature information comprises inertia sensing feature information of the user equipment.

The inertia sensing feature information for example can be obtained by at least one inertia sensor of the user equipment. The at least one inertia sensor for example can comprise at least one of following:
an acceleration sensor, a gyroscope, a magnetic sensor, a gravity sensor and the like.

The first motion feature information for example can comprise the inertia sensing feature information collected by one of the at least one inertia sensor.

In another example embodiment, the first motion information further comprises: first timestamp information corresponding to the first motion feature information.

In an example embodiment, corresponding between the first timestamp information and the first motion feature information for example can be as follows:
the first timestamp information comprises timestamp information of each point or at least one feature point in the first motion feature information.

For example, in an example embodiment, the first motion feature information comprises: acceleration change information of the user equipment, and the first timestamp information can comprise: timestamps corresponding to all points or partial feature points in the acceleration change information. In an example embodiment, in order to enhance comparability with other pieces of equipment, and optionally, the first timestamp information is absolute timestamp information. For example, in an example embodiment, the user equipment is synchronized with time of a time server by network, and the absolute timestamp information is the time obtained by synchronizing with the time server.

In an example embodiment, the step 110 comprises directly or indirectly obtaining the first motion information from the user equipment in a communicating manner by the near-to-eye equipment.

S130: executing, by the near-to-eye equipment, an interaction operation with the user equipment in response to the first motion information matching with the second motion information.

In the embodiment of the present application, the first motion information matching with the second motion information is that motion of the user equipment corresponding to the first motion information and the motion of a gazed object of the at least one eye corresponding to the second motion information are consistent. For example, when the user equipment moves rightward, the gazing point of the at least one eye also moves rightward; and when the user equipment moves close to the user, the gazing point of the at least one eye also moves close to the user.

According to foregoing description, in an example embodiment, the match of the motion feature information can represent consistency of the two motions. For example, the first motion information matching with the second motion information can comprise:

at least one first motion feature corresponding to the first motion feature information matches with the at least one second motion feature corresponding to the second motion feature information.

Quantities of the at least one first motion feature and the at least one second motion feature can be set as required. For example, when a safety level requirement is low, the quantity can be less, and when the safety level requirement is low, the quantity can be more.

A case of the first motion feature information comprising angle change information and the second motion feature information comprising the motion feature information of the eye motion information of the user is taken as an example to explain:

For example, the angle change information comprises a first motion feature: motion for a first duration at a first angular speed clockwise, and then motion for a second duration by a second angular speed counterclockwise.

The second motion feature information matched with the first motion feature information for example can comprise a second motion feature: the head of the user is motionless, and the eye balls move to a first direction for the first duration and then move to the opposite direction for the second duration.

In an example embodiment, the match condition between the first motion feature and the second motion feature can be learned by previous training.

In an example embodiment, when the first motion information comprises the first timestamp information and the second motion information comprises the second timestamp information, the first motion information matching with the second motion information further comprises:

according to the first timestamp information and the second timestamp information, first time corresponding to each first motion feature in the at least one first motion feature essentially coincides with second time corresponding to each matched second motion feature in the at least one second motion feature.

Still the implementation mode of the angle change information and the user eye motion information is taken as an example, here, the first time essentially coincides with the second time can be:

an initial point of the first duration corresponding to the angle change information same as an initial point of the first duration corresponding to the eye motion information; an initial point of the second duration corresponding to the angle change information same as an initial point of the second duration corresponding to the eye motion information.

Of course, in some possible implementation modes, due to reasons of equipment delay, the first time and the second time are not completely coincided and possibly have some deviation. In these implementation modes, when the deviation between the first time and the second time is in a set range, the two are considered to be coincided.

In the present embodiment, besides the match of the motion features, whether the first motion information and the second motion information are matched is determined in combination with the first timestamp information and the second timestamp information, causing the interaction between the user equipment and the near-to-eye equipment to be safer. For example, in an example embodiment, a user hopes that his own worn intelligent glasses is matched with his own worn intelligent bracelet, thus controls hands to make a motion and gaze the intelligent bracelet; in this process, another user in the vicinity possibly also controls his own hands to make a motion (the other user possibly learns the motion of the user), therefore, the second motion information of the user may be matched with the first motion information of the two intelligent bracelets, then which intelligent bracelet is the gazed intelligent bracelet of the user can be determined according to the match of the timestamps.

In an example embodiment, the interaction operation with the user equipment can comprise:

associating operation with the user equipment.

For example, the near-to-eye equipment broadcasts a pairing request and the second motion information; after obtaining the pairing request and the second motion information, the user equipment determines that the second motion information is matched with its first motion information according to foregoing solution, and the associating operation with the user equipment can be sending of a pairing response to the user equipment. After receiving the pairing response, the user equipment can be directly associated with the near-to-eye equipment without needing the pairing code for verification.

It can be seen that in the present embodiment, the first motion information and the second motion information achieve an associating code between pieces of equipment, and the match between two pieces of equipment is determined according to the match between the two without the need of manual input of the user and is very convenient. In addition, the near-to-eye equipment side adopts the motion information of the at least one eye as the second motion information, and introduction of attention of the user into an association process of the two pieces of equipment enables the association to be more accurate and safer. For example, when multiple pieces of user equipment exist in one scene, the user equipment viewed by the user can be accurately determined as the user equipment required to be associated with the near-to-eye equipment.

In one possible scene, the user needs to associate two pieces of user equipment, for example, one cellphone and one intelligent bracelet of the user are paired. In an example embodiment, the interaction operation with the user equipment comprises:

associating operation between the user equipment and other pieces of user equipment; and wherein the other pieces of user equipment are associated with the near-to-eye equipment.

The associating operation between the user equipment and other pieces of user equipment can comprise: sending associating information of the other pieces of user equipment to the user equipment; or sending the associating information of the user equipment to the other pieces of user equipment. The associating information for example can comprise one associating request.

For example, by forgoing method of the embodiment of the present application, the near-to-eye equipment is associated with the user equipment, for example, the user holds the cellphone to shake and gazes, the cellphone outwards broadcasts or broadcasts its own first motion information and associating information in a directed manner to the nearby near-to-eye equipment, after obtaining the first motion information and the associating information, the near-to-eye equipment determines that the first motion information is matched with the second motion information of the at least one eye obtained by the near-to-eye equipment, then the near-to-eye equipment is associated with the cellphone. Then, then the user shakes intelligent bracelet and gazes, the intelligent bracelet outwards broadcasts or broadcasts another piece of first motion information and associating information in a directed manner to the nearby near-to-eye equipment, after obtaining another piece of first motion information and associating information, the near-to-eye equipment determines that the other piece of first motion information is matched with another piece of second motion information of the at least one eye obtained by the near-to-eye equipment, then the near-to-eye equipment is associated with the intelligent bracelet, in addition, the intelligent bracelet can send an associating response to the cellphone and the cellphone is associated with the intelligent bracelet.

Of course, the skilled in the art can know that the associating operation between the user equipment and other pieces of user equipment has other possible manners, which are not listed one by one, besides foregoing specific examples.

It can be seen from the present embodiment that when the pieces of user equipment of the user need associating, through the mode of the embodiment of the present application, the user can finish the associating between the pieces of user equipment by only respectively moving the user equipment and gazing, and implementation is convenient and safe.

In an example embodiment, the user equipment and the near-to-eye equipment are in the association state or finish the pairing association by foregoing pairing operation, and the near-to-eye equipment has a permission that the user equipment does not have, the interaction operation with the user equipment further comprises:

authorization authenticating operation on the near-to-eye equipment.

For example, in an example embodiment, the authorization authenticating operation comprises: sending an authorization authenticating code to the near-to-eye equipment.

In an example embodiment, the permission of the near-to-eye equipment can be obtained in advance. In another example embodiment, before the authorization authenticating operation on the user equipment, the method further comprises:

authenticating an identity of the user by the near-to-eye equipment and obtaining at least one permission corresponding to the identity of the user; and the authorization authenticating operation on the user equipment comprises: authenticating at least one in the at least one permission to the user equipment.

In an example embodiment, when near-to-eye equipment performs authenticating on the identity of the user, the authenticating is performed by performing iris recognition on the user by the near-to-eye equipment.

In an example embodiment, the at least one permission comprises a paying permission. For example, in an example embodiment, the near-to-eye equipment of the user obtains the paying permission corresponding to the user. When the user needs to approach to the authenticated equipment by using one paying reader for paying, since the near-to-eye equipment of the user inconveniently approaches to the paying reader under a wearing condition, but when the near-to-eye equipment is not worn, its use is not safe enough. At the moment, associating with the near-to-eye equipment can be performed by another piece of user equipment by foregoing method, the near-to-eye equipment sends corresponding verifying information to the other piece of user equipment, thus facilitating the other piece of user equipment to pay by approaching to the paying reader.

It can be seen from the present embodiment that since the near-to-eye equipment can conveniently safely perform user authenticating by an iris detection manner in real time, the near-to-eye equipment can be regarded as a piece of equipment safer than other pieces of common user equipment. Through the method of the present embodiment, the permission of the near-to-eye equipment is authenticated to the user equipment in such way, thus causing the use of the user equipment to be very safe. The method is particularly suitable for use in occasions with high safety levels.

Those skilled in the art can know that besides foregoing interaction operations with the user equipment, other interaction operations can also be included and are repeated herein.

Those skilled in the art can understand that in the method of example embodiments of the present application, numbers of the steps do not indicate an execution sequence, the execution sequence of all steps is determined by functions and internal logic thereof and does not limit the implementation process of example embodiments of the present application in any way.

Figure 2:
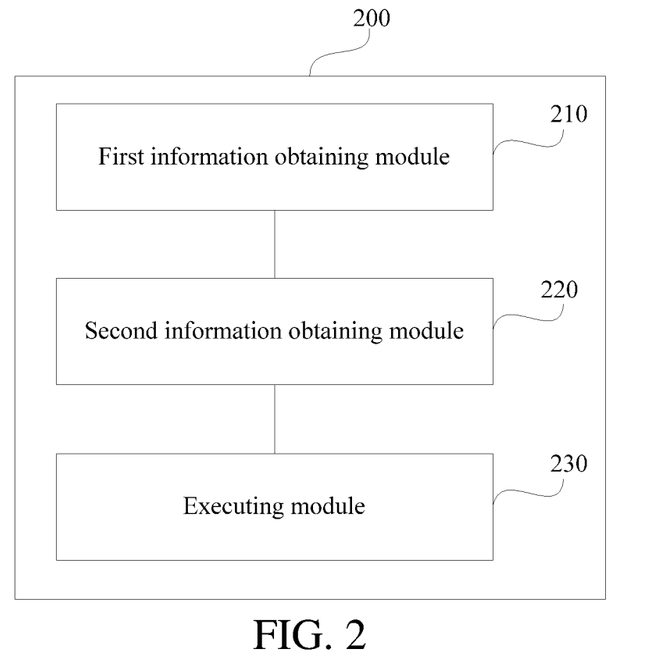
FIG. 2 is a structural schematic block diagram of near-to-eye equipment according to an example embodiment of the present application.

As shown in FIG. 2, an example embodiment of the present application provides near-to-eye equipment 200, comprising:

a first information obtaining module 201, configured for obtaining first motion information of user equipment;

a second information obtaining module 220, configured for obtaining second motion information of at least one eye of a user; and an executing module 230, configured for executing an interaction operation with the user equipment in response to the first motion information matching with the second motion information.

According to at least one example embodiment of the present application, when motion information of a piece of user equipment is matched with the motion information of at least one eye of a user collected by a piece of near-to-eye equipment, an interaction operation with the user equipment is performed, and a natural, portable and safe interaction method between pieces of equipment is provided. The present application is particularly suitable for performing interaction between the near-to-eye equipment and one or more pieces of user equipment that the user wants to interact in a case that a plurality of pieces of user equipment exist in a view of the at least one eye of the user.

The near-to-eye equipment of the embodiment of the present application is further described by following example embodiments.

In an example embodiment, the first motion information comprises: first motion feature information of the user equipment.

In an example embodiment, the first motion feature information for example can be one or more of pieces of information directly representing motion of the user equipment, such as a motion direction, a motion speed, a motion distance, motion time and a motion acceleration.

In another example embodiment, the first motion feature information can also be one or more of pieces of information indirectly representing motion of the user equipment. For example, in an example embodiment, the first motion feature information comprises inertia sensing feature information of the user equipment.

The inertia sensing feature information for example can be obtained by at least one inertia sensor of the user equipment. The at least one inertia sensor for example can comprise at least one of following:

an acceleration sensor, a gyroscope, a magnetic sensor, a gravity sensor and the like.

In another example embodiment, the first motion information further comprises: first timestamp information corresponding to the first motion feature information.

In an example embodiment, the first information obtaining module 210 can comprise a communicating unit, configured for directly or indirectly obtaining the first motion information from the user equipment.

In an example embodiment, the second motion information can comprise: second motion feature information of the at least one eye, wherein motion of the at least one eye can comprise: motion of the at least one eye in at least one eye socket or motion of the at least one eye along with a head of the user, therefore, in an example embodiment, the second motion feature information can comprise: the eye motion feature information of the at least one eye and the head motion feature information of the user.

In another example embodiment, the second motion feature information comprises:

motion feature information of a gazing point of the at least one eye.

In an example embodiment, for example, the motion feature information of the gazing point can be obtained according to foregoing eye motion feature information and the head motion feature information.

In an example embodiment, optionally, the second motion information further comprises: second timestamp information corresponding to the second motion feature information.

In an example embodiment, the second information obtaining module 220 can comprise:

at least one second sensing unit, configured for collecting the second motion information.

The at least one second information sensing unit for example can comprise an eye motion sensing subunit such as the eye aligning camera or the eye electrical signal sensor in the embodiment of the method, which is configured for obtaining the eye motion feature information of the use; and an inertia sensor in the near-to-eye equipment which is configured for obtaining the heat motion feature information of the user.

In an example embodiment, the second information obtaining module 220 can comprise:

a reading unit, configured for reading the second motion information stored in a memory from the local memory.

Figure 3A:
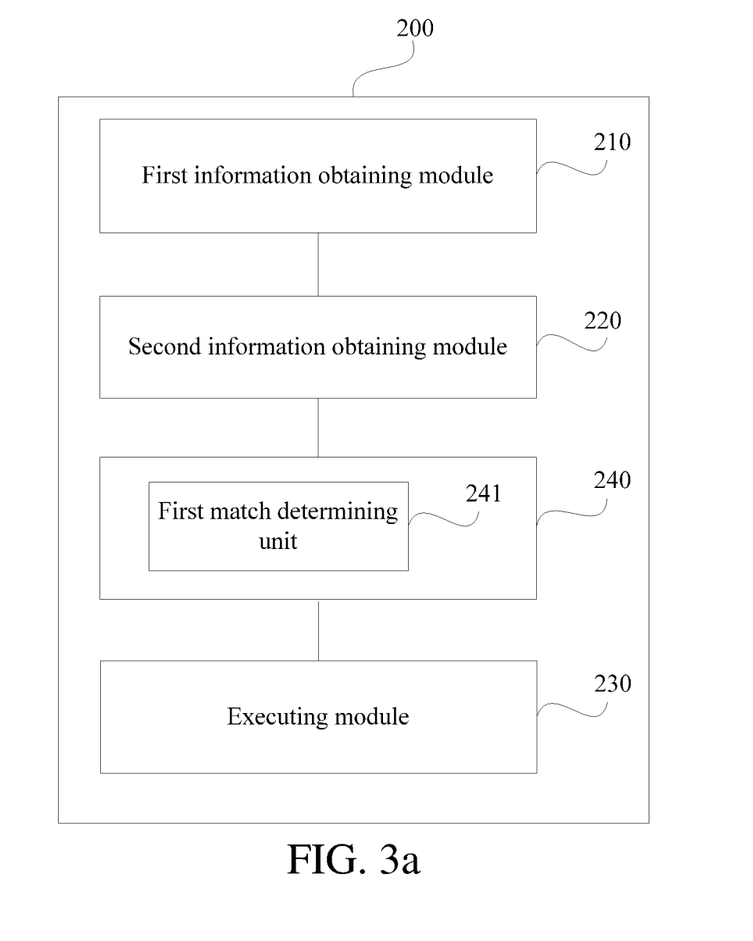
FIG. 3a-FIG. 3f are structural schematic block diagrams of six pieces of user equipment according to an example embodiment of the present application.

In an example embodiment, as shown in FIG. 3a, the user equipment 200 further comprises a match determining module 240, configured for determining whether the first motion information is matched with the second motion information.

In the embodiment of the present application, the match between the first motion information and the second motion information is that motion of the user equipment corresponding to the first motion information and the motion of a gazed object of the at least one eye corresponding to the second motion information are consistent.

In an example embodiment, as shown in FIG. 3a, the match determining module 240 comprises:

a first match determining unit 241, configured for determining whether the at least one first motion feature corresponding to the first motion feature information and the at least one second motion feature corresponding to the second motion feature information are matched, wherein, at least when the at least one first motion feature and the at least one second motion feature are matched, the first motion information and the second motion information are matched.

Figure 3B:
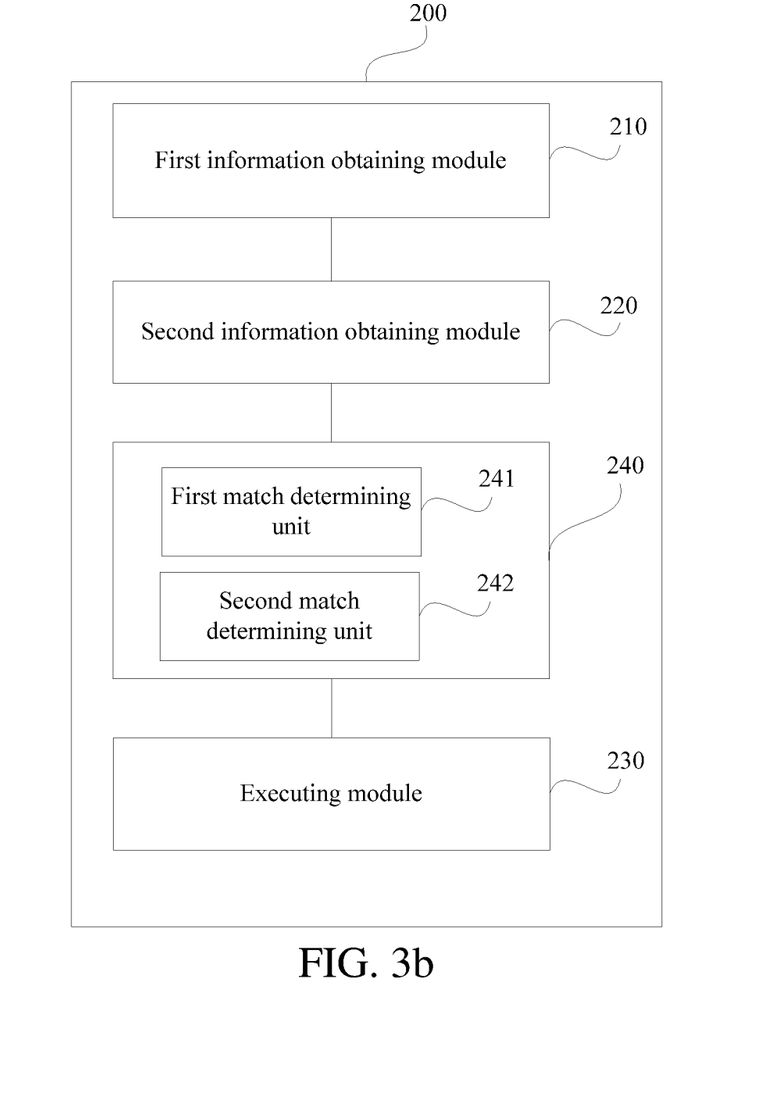

In an example embodiment, when the first motion information comprises the first timestamp information and the second motion information comprises the second timestamp information, as shown in FIG. 3b, the match determining module 240 further comprises:

a second match determining unit 242, configured for, according to the first timestamp information and the second timestamp information, determining whether first time corresponding to each first motion feature in the at least one first motion feature is essentially coincided with second time corresponding to each matched second motion feature in the at least one second feature, wherein when the at least one motion feature matches with the at least one second motion feature as well as the first time and the second time are essentially coincided, the first motion information and the second motion information are matched.

In the present embodiment, besides the match of the motion features, whether the first motion information and the second motion information are matched is determined in combination with the match between the first timestamp information and the second timestamp information, thus enabling the interaction between the user equipment and the near-to-eye equipment to be safer.

Figure 3C:
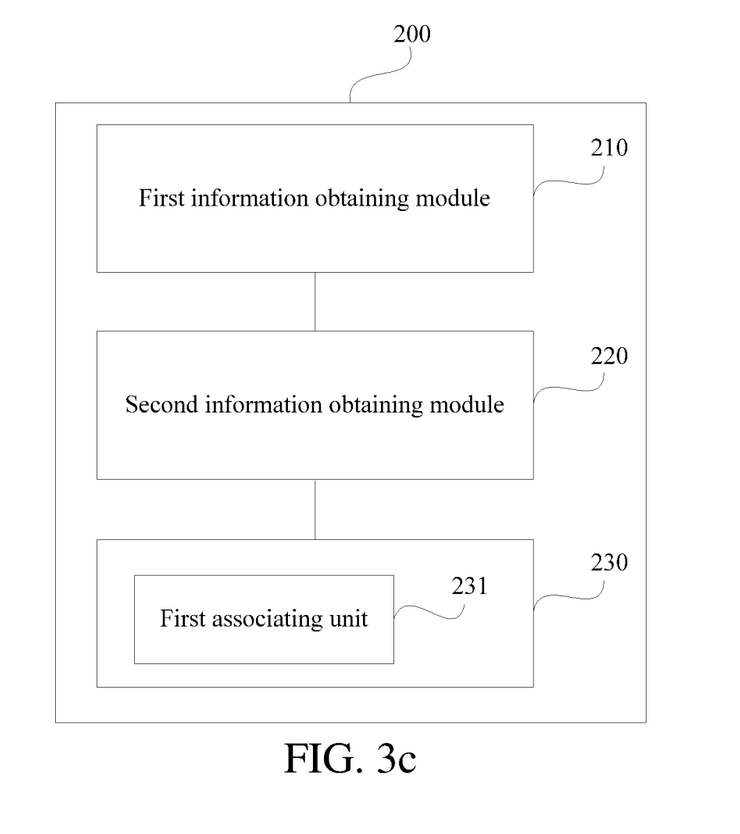

As shown in FIG. 3c, in an example embodiment, optionally, the executing module 230 can comprise:

a first associating unit 231, configured for executing the associating operation of the equipment.

It can be seen that in the present embodiment, the first motion information and the second motion information achieve an associating code between pieces of equipment, and the match between two pieces of equipment is determined according to the match between the two without the need of manual input of the user and is very convenient. In addition, the near-to-eye equipment side adopts the motion information of the at least one eye as the second motion information, and introduction of attention of the user into an association process of the two pieces of equipment enables the association to be more accurate and safer.

Figure 3D:
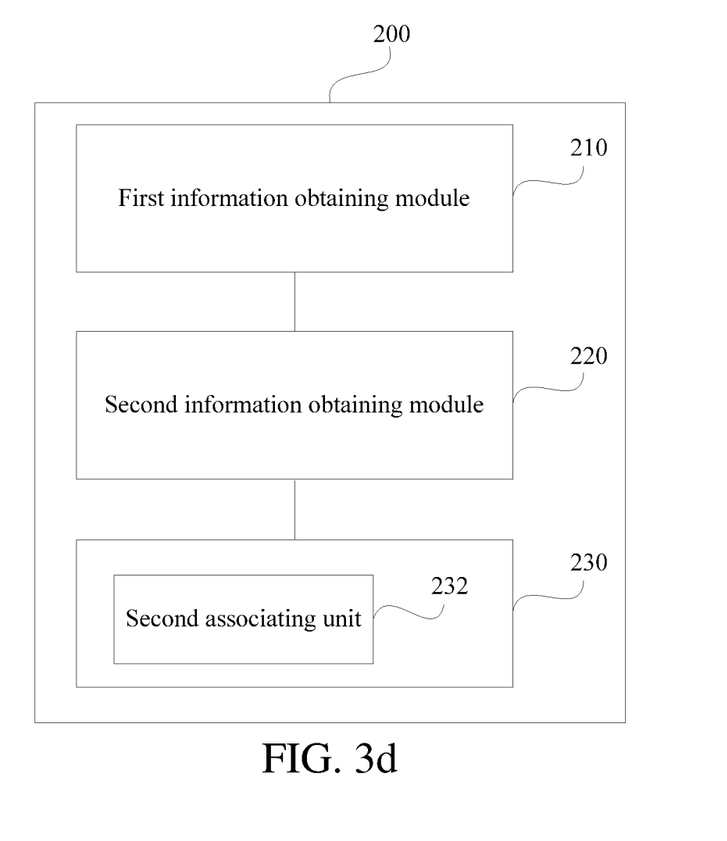

As shown in FIG. 3d, in an example embodiment, optionally, the executing module 230 can comprise:

a second associating unit 232, configured for performing the associating operation between the user equipment and other pieces of user equipment, wherein the other pieces of user equipment and the near-to-eye equipment are associated.

Further description about how the second associating unit 232 executes the associating operation between the user equipment and other pieces of user equipment can refer to corresponding description in the embodiment as shown in FIG. 1.

It can be seen from the present embodiment that when the pieces of user equipment of the user need associating, through the mode of the embodiment of the present application, the user can finish the associating between the pieces of user equipment by only respectively moving the user equipment and gazing, and implementation is convenient and safe.

Figure 3E:
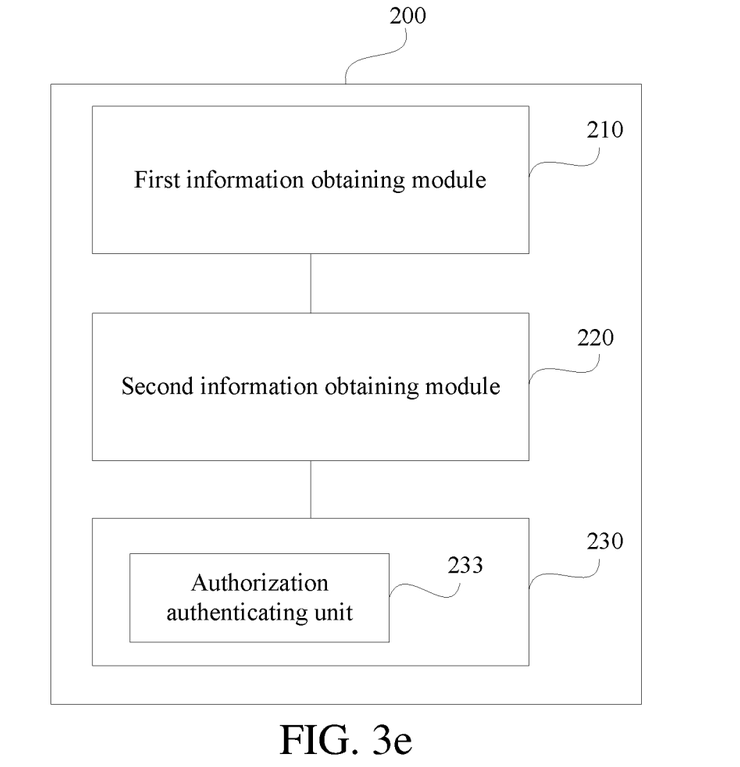

As shown in FIG. 3e, in an example embodiment, optionally, the executing module 230 can comprise:

an authorization authenticating unit 233, configured for performing authorization authenticating operation on the user equipment.

Figure 3F:
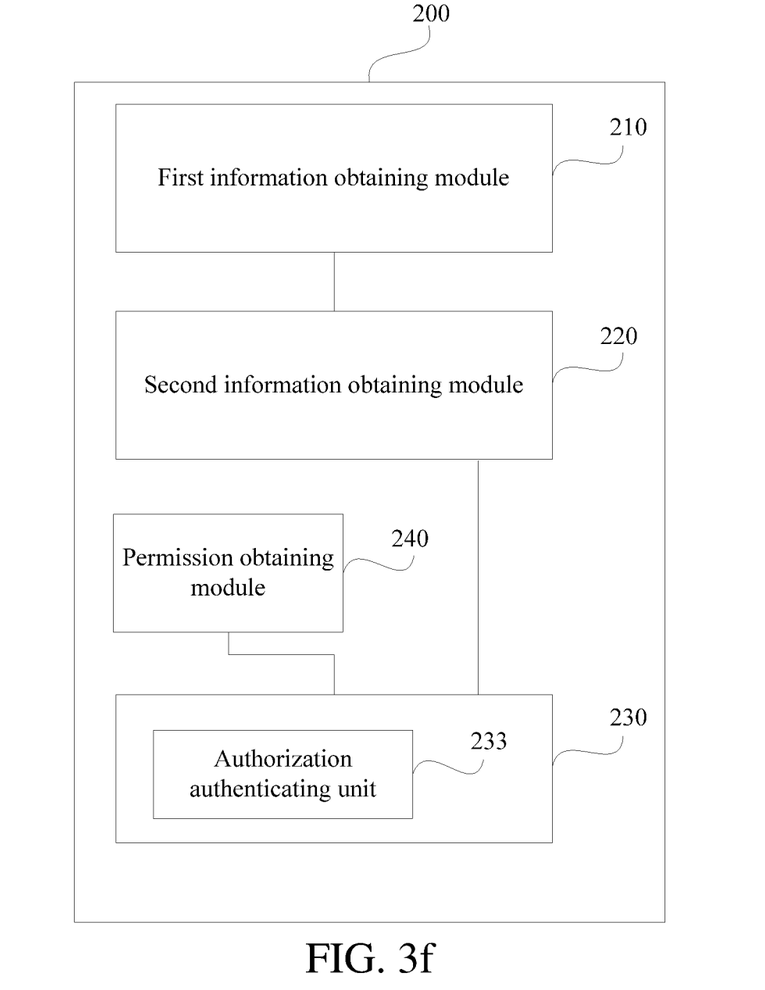

In an example embodiment, as shown in FIG. 3f, the user equipment 300 further comprises:

a permission obtaining module 240, configured for obtaining at least one permission corresponding to an identity of the user by authenticating the identity of the user by the near-to-eye equipment;

the authorization authenticating unit 233 is further configured for authenticating at least one in the at least one of permission to the user equipment, wherein in an example embodiment, when the permission obtaining module 240 performs authenticating on the identity of the user by the near-to-eye equipment, the authenticating is performed by performing iris recognition on the user by an iris detection sensor of the near-to-eye equipment.

It can be seen from the present embodiment that since the near-to-eye equipment can conveniently safely perform user authenticating by an iris detection manner in real time, the near-to-eye equipment can be regarded as a piece of equipment safer than other pieces of common user equipment. Through the method of the present embodiment, the permission of the near-to-eye equipment is authenticated to the user equipment in such way, thus causing the use of the user equipment to be very safe. The method is particularly suitable for use in occasions with high safety levels.

Further functions of respective modules and units of the embodiment of the present application refer to corresponding description as shown in FIG. 1 and are not repeated herein.

Figure 4:
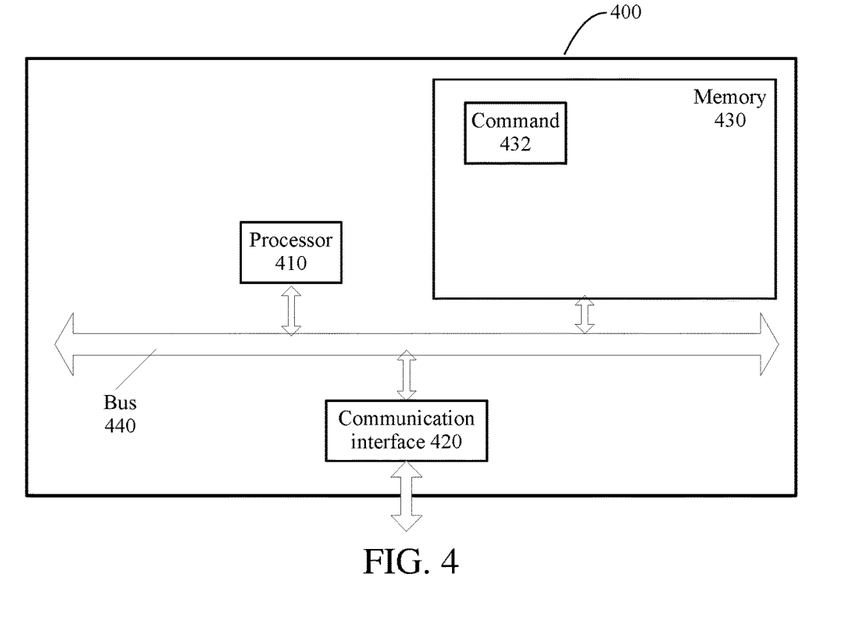
FIG. 4 is a structural schematic block diagram of one piece of user equipment according to an example embodiment of the present application.

FIG. 4 is a structural schematic diagram of user equipment 400 according to an embodiment of the present application, which does not limit specific implementation of the user equipment 400. As shown in FIG. 4, the user equipment 400 comprises:

a processor 410, a communication interface 420, a memory 430 and a communication bus 440, wherein, the processor 410, the communication interface 420 and the memory 430 communicate with one another by the communication bus 440.

The communication interface 420 is configured for communication with a network element such as a client end.

The processor 410 is configured for executing a command 432 and specifically executing related steps in the embodiments of foregoing method.

Specifically, the command 432 can comprise a computer operation command.

The processor 410 can be a CPU or an ASIC (Application Specific Integrated Circuit), or is configured to be one or more integrated circuits to execute the embodiments of the present application.

The memory 430 is configured for storing the command 432. The memory 430 possibly contains a high speed Ram memory and possibly further comprises a non-volatile memory, for example, at least one disk memory. The command 432 is specifically configured for enabling the user equipment 400 to execute following steps:

obtaining second motion information of at least one eye of a user;

obtaining first motion information of user equipment; and executing an interaction operation with the user equipment in response to the first motion information matching with the second motion information.

The implementation of the steps in the command 432 refers to the corresponding descriptions of corresponding steps and units in the foregoing embodiments, which are not repeated herein. It may be clearly understood by a person skilled in the art that, for the purpose of convenient and brief description, reference may be made to the description of corresponding procedures in the foregoing method embodiments for detailed working procedures of the foregoing devices and modules, and details are not repeated herein.

It can be appreciated by a person of ordinary skill in the art that, exemplary units and method steps described with reference to the embodiments disclosed in this specification can be implemented by electronic hardware or a combination of computer software and electronic hardware. Whether these functions are executed by hardware or software depends on specific applications and design constraints of the technical solution. A person skilled in the art may use different methods to implement the described functions for each specific application, but such implementation should not be construed as a departure from the scope of the present application.

If the function is implemented in the form of a software functional unit and is sold or used as an independent product, the product can be stored in a computer-readable storage medium. Based on this understanding, the technical solution of the present application essentially, or the part that contributes to the prior art, or a part of the technical solution may be embodied in the form of a software product; the computer software product is stored in a storage medium and comprises several instructions for enabling a computer device (which may be a personal computer, a server, a network device, or the like) to execute all or some of the steps of the method in the embodiments of the present application. The foregoing storage medium comprises a USB flash drive, a removable hard disk, a read-only memory (ROM), a random access memory (RAM), a diskette or a compact disk that can be configured for storing a program code.

The above example embodiments are only used to describe the present application, rather than limit the present application; various alterations and variants can be made by those of ordinary skill in the art without departing from the spirit and scope of the present application, so all equivalent technical solutions also belong to the scope of the present application, and the scope of patent protection of the present application should be defined by claims.

What is claimed is:

1. A method, comprising:
    obtaining, by a near-to-eye equipment comprising a processor, second motion information of an eye of a user associated with a user identity, wherein the second motion information corresponds to a motion of an object gazed at by the eye, and wherein the near-to-eye equipment is worn proximate to the eye of the user;
    obtaining, by the near-to-eye equipment, first motion information of a user equipment corresponding to motion of the user equipment; and
    executing, by the near-to-eye equipment, an interaction operation with the user equipment in response to determining that the user equipment is the object gazed at by the eye based on the first motion information being determined to match the second motion information.

2. The method of claim 1, wherein the first motion information comprises first motion feature information of the user equipment, and
    wherein the second motion information comprises second motion feature information of the eye of the user.

3. The method of claim 2, wherein the first motion feature information comprises inertia sensing feature information of the user equipment.

4. The method of claim 2, wherein the second motion feature information comprises eye motion feature information of the eye and head motion feature information associated with the user identity.

5. The method of claim 2, wherein the second motion feature information comprises motion feature information of a gazing point of the eye associated with the user identity.

6. The method of claim 2, wherein the first motion information being determined to match the second motion information comprises a first motion feature corresponding to the first motion feature information being determined to match with the second motion feature corresponding to the second motion feature information.

7. The method of claim 6, wherein the first motion information further comprises first timestamp information corresponding to the first motion feature information, and
wherein the second motion information further comprises second timestamp information corresponding to the second motion feature information.

8. The method of claim 7, wherein the first motion information being determined to match the second motion information comprises:
according to the first timestamp information and the second timestamp information, a first time corresponding to the first motion feature substantially coincides with a second time corresponding to the second motion feature.

9. The method of claim 1, wherein an interaction operation with the user equipment comprises: an associating operation with the user equipment.

10. The method of claim 1, wherein the interaction operation with the user equipment comprises:
an associating operation between the user equipment and another piece of user equipment, and
wherein the other piece of user equipment and the user equipment are associated.

11. The method of claim 1, wherein the interaction operation with the near-to-eye equipment comprises:
an authorization authenticating operation on the near-to-eye equipment.

12. A near-to-eye equipment, comprising:
a memory that stores executable modules; and
a processor, coupled to the memory, that executes or facilitates execution of the executable modules, the executable modules comprising:
a first information obtaining module configured to obtain first motion information corresponding to motion of a user equipment;
a second information obtaining module configured to obtain second motion information corresponding to motion of an object that is viewed by at least one eye of a user associated with a user identity, wherein the second motion information is captured by the near-to-eye equipment when it is worn by the user near the at least one eye of the user; and
an executing module configured to execute an interaction operation with the user equipment that facilitates determining that the user equipment is the object in response to the first motion information matching the second motion information.

13. The near-to-eye equipment of claim 12, wherein the executable modules further comprise:
a match determining module configured to determine whether the first motion information has matched the second motion information.

14. The near-to-eye equipment of claim 13, wherein:
the first motion information comprises first motion feature information of the user equipment; and
the second motion information comprises second motion feature information of the at least one eye of the user, wherein the match determining module comprises:
a first match determining unit configured to determine whether the at least one first motion feature corresponding to the first motion feature information and the at least one second motion feature corresponding to the second motion feature information are matched.

15. The near-to-eye equipment of claim 14, wherein the first motion feature information comprises:
inertia sensing feature information of the user equipment.

16. The near-to-eye equipment of claim 14, wherein the second motion feature information comprises:
eye motion feature information of the at least one eye of the user and head motion feature information of the user.

17. The near-to-eye equipment of claim 14, wherein the second motion feature information comprises:
motion feature information of a gazing point of the at least one eye of the user.

18. The near-to-eye equipment of claim 14, wherein
the first motion information further comprises first timestamp information corresponding to the first motion feature information; and
the second motion information further comprises second timestamp information corresponding to the second motion feature information, wherein the match determining module further comprises:
a second match determining unit configured to, according to the first timestamp information and the second timestamp information, determine whether at least one first time corresponding to each first motion feature represented in the first motion feature information is proximate in time with at least one second time corresponding to each matched second motion feature in the second motion feature information.

19. The near-to-eye equipment of claim 12, wherein the executing module comprises:
a first associating unit configured to execute an associating operation with the user equipment.

20. The near-to-eye equipment of claim 12, wherein the executing module comprises:
a second executing module configured to execute an associating operation between the user equipment and other pieces of user equipment, wherein the other pieces of user equipment and the user equipment are associated.

21. The near-to-eye equipment of claim 1, wherein the executing module comprises:
an authorization authenticating unit configured to perform an authorization authenticating operation on the user equipment.

22. A near-to-eye equipment, comprising:
a memory configured to store a command;
a processor configured to execute the command of the memory, wherein the command enables the processor to execute operations, comprising:
obtaining second motion information corresponding to motion of an object focused on by an eye of a user, wherein the second motion information is generated by the near-to-eye equipment when worn by the user near to the eye of the user;

obtaining first motion information corresponding to motion of a user equipment; and executing an interaction operation with the user equipment in response to determining, based on the first motion information matching with the second motion information, that the user equipment is the object focused on by the eye of the user.

* * * * *